(12) United States Patent
Handley

(10) Patent No.: US 9,741,178 B1
(45) Date of Patent: Aug. 22, 2017

(54) FARE COLLECTION SYSTEM IN A PUBLIC TRANSIT NETWORK

(71) Applicant: Xerox Corporation, Norwalk, CT (US)

(72) Inventor: John C. Handley, Fairport, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/378,182

(22) Filed: Dec. 14, 2016

(51) Int. Cl.
*G07B 15/02* (2011.01)
*G06K 19/06* (2006.01)
*G06K 7/14* (2006.01)
*G06Q 20/34* (2012.01)

(52) U.S. Cl.
CPC ........... *G07B 15/02* (2013.01); *G06K 7/1417* (2013.01); *G06K 19/06037* (2013.01); *G06Q 20/34* (2013.01)

(58) Field of Classification Search
USPC ........................................ 235/375, 376, 384
See application file for complete search history.

(56) References Cited

U.S. PATENT DOCUMENTS

| 8,832,001 | B2 | 9/2014 | Handley | |
|---|---|---|---|---|
| 2008/0203170 | A1* | 8/2008 | Hammad | G06K 17/00 235/492 |
| 2009/0106101 | A1* | 4/2009 | Green | G06Q 10/08 705/14.23 |
| 2009/0287408 | A1* | 11/2009 | Gerdes | G01C 21/3423 701/533 |
| 2010/0088026 | A1* | 4/2010 | Manolescu | G08G 1/20 701/469 |
| 2010/0217628 | A1* | 8/2010 | Arnaud | G06Q 10/02 705/5 |
| 2014/0035921 | A1 | 2/2014 | Yeh | |
| 2014/0039986 | A1 | 2/2014 | Handley | |
| 2015/0032490 | A1 | 1/2015 | Handley | |
| 2015/0199697 | A1* | 7/2015 | Handley | G06Q 10/067 705/7.31 |
| 2015/0279217 | A1* | 10/2015 | Chen | G08G 5/003 701/123 |
| 2016/0019727 | A1* | 1/2016 | Norton | G06Q 20/10 705/13 |
| 2016/0104081 | A1 | 4/2016 | Ho et al. | |
| 2016/0171882 | A1 | 6/2016 | Handley et al. | |

* cited by examiner

*Primary Examiner* — Tuyen K Vo
(74) *Attorney, Agent, or Firm* — Fox Rothschild LLP

(57) ABSTRACT

A system in a public transit network may include a fare collection system, a fare management system, and a processing device for assessing the riskiness of fare classes in the transit network and causing the fare management system to take an action based on the assessment. Particularly, the processing device will receive fare information from the fare collection system, such as via a token reader, determine a fare return series over a period of time, apply a Capital Asset Pricing Model to the fare return series and assess the return versus volatility chart for multiple fare classes. Based on the assessment, the processing device will cause the fare management system to take an action such as changing a fare price or a route, deleting a fare class or a route, combining one or more fare classes or routes, or combining one or more fare classes with one or more routes.

22 Claims, 18 Drawing Sheets

FARE COLLECTION SYSTEM IN A PUBLIC TRANSIT NETWORK

BACKGROUND

This disclosure relates to methods and systems for fare collection in a public transit network.

In a public transit network, there is a need to improve the fare collection systems in order to manage fare offerings and fare prices while realizing the potential growth of the transit network. There is also a need for agencies to understand the insights of fare collection systems in a public transit network.

This document describes devices and methods that are intended to address at least some issues discussed above and/or other issues.

SUMMARY

A system in a public transit network may include a fare collection system, a fare management system, a processing device communicatively coupled to the fare collection system, a non-transitory computer readable medium storing one or more programming instructions which are configured to cause the processing device to assess the riskiness of fare classes in the transit network and cause the fare management system to take an action based on the assessment. Particularly, the fare collection system is configured to collect fares from a number of passengers boarding or getting off a vehicle. The processing device is configured to receive fare information from the fare collection system and use the received fare information to determine a fare return series over a period of time; apply a Capital Asset Pricing Model to the fare return series to generate a report, which includes a return versus volatility chart for a plurality of fare classes; and cause the fare management system to take an action based on the generated report.

The fare collection system may include a token reader and the processing device may be configured to receive, from the token reader, a fare value indicative of a fare class and a time stamp recording when a passenger who bore a token passes within a detectable communication range of a receiver of the token reader. The token reader may be positioned at a transit stop in the public transit network or onboard a vehicle dispatched in the public transit network.

In generating the report, the processing device determines a beta value for each of the plurality of fare classes, wherein the beta value is indicative of riskiness of each fare class with respect to revenue generation. The processing device may also determine an expected return value for each of the plurality of fare classes based on the beta value for each fare class, and determine a volatility value for each of the plurality of fare classes based a standard deviation of the fare return for each fare class.

The processing device may also provide a graphical user interface to allow a user to select a range of fare time series or time bins to display a return versus volatility chart based on the selected range. The generated report may also include a return versus volatility chart for a plurality of routes and, based on the generated report, the processing device may cause the fare management system to take an action such as: changing a fare price for a fare class or deleting a fare class, changing a route or deleting a route, combining one or more fare classes, combining one or more routes, or combining one or more fare classes with one or more routes.

DETAILED DESCRIPTION

Figure 1:
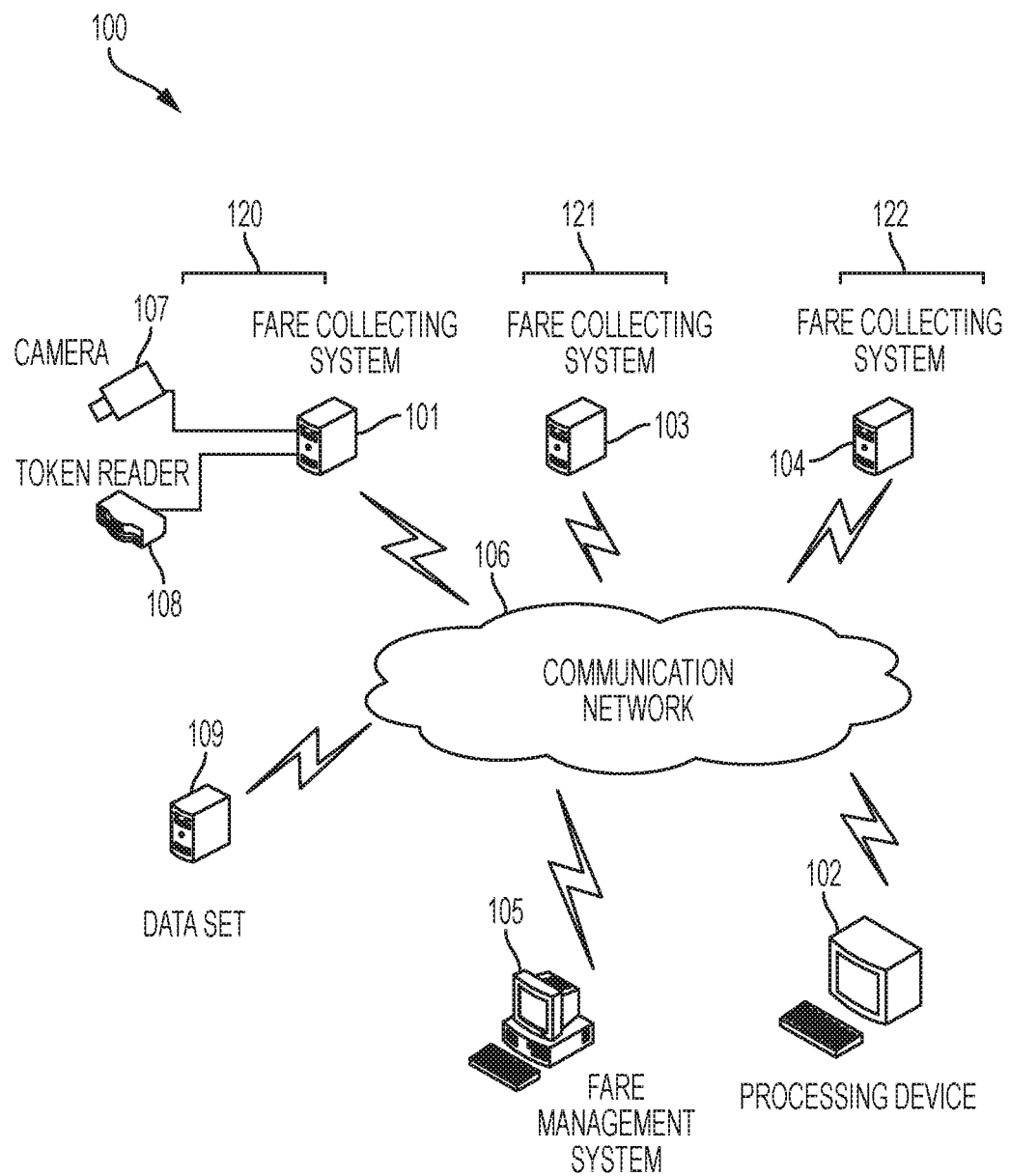
FIG. 1 depicts an example of a system in a public transit network according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

Each of the terms "camera," "video capture module," "imaging device," "image sensing device" or "imaging sensor" refers to a software application and/or the image sensing hardware of an electronic device that is capable of optically viewing a scene and converting an interpretation of that scene into electronic signals so that the interpretation is saved to a digital video file comprising a series of images.

The term "public transit network" or "public transit system" refers to a system or network that includes a plurality of transit stops, at which passengers may board or disembark. For example, the public transit network may include bus transportation, train transportation, ferry service, shuttle service, and/or air transportation. The public transit system may or may not charge a passenger a fare for riding the system.

The term "fare class" refers to an assigned category or class of fares that corresponds to a particular fare amount from one stop to another along a route in a public transit system. A passenger who rides a public transit pays based on a fare class. For example, a list of fare classes in a transit system may include regular fare (full price), section fare, concession fare, senior fare, student fare, children fare, monthly or weekly fare.

The term "fare medium" refers to a physical device or medium that has or stores a value and that can be used to pay a fare. For example, a fare medium could include cash (either paper currency or coins), a card containing a magnetic stripe with memory that stores remaining value, a smart card with a radio frequency identification (RFID) chip, a smart phone or other electronic device with an software application that maintains an amount of stored value and enables payment through a barcode (such as a quick response code, or QR Code) that can be scanned or through a wireless communication such as near field communication (NFC).

The term "token" refers to a physical device or a medium bearing a unique credential that is stored on the device or the medium in a format that can be automatically read by a token reading device when the token is presented to the token reading device. A fare medium can be a type of token. Alternatively, a token may serve to identify a user who bears a fare medium so that the token serves as a way to enable a token reader to receive payment from the fare medium. Examples of tokens include cash, either paper currency or coins, a card containing a magnetic stripe with memory that stores remaining value (such as credit cards, debit cards, transportation system fare cards and the like), a smart card with an RFID chip, smart phone or other electronic device with an software application that maintains an amount of stored value and enables payment through a barcode (such as a QR Code) that can be scanned or through a wireless communication such as NFC, and other devices and media that are configured to facilitate a transaction. The token reader may include a transceiver for receiving data from a transmitter of the token, a sensor that can sense when the token has been positioned in or near the reader, or a communications port that detects when the token has been inserted into the reader. A "token" may bear different face values per transaction according to a fare class.

Each of the terms "Capital Asset Pricing Model" or "CAPM" refers to corresponding terms that are known with the field of finance.

With reference to FIG. 1, a system 100 in a public transit network includes one or more fare collection systems 101, 103, 104, where each fare collection system is installed at a transit stop 120-122 in the transit network, and configured to collect fare information. The fare collection system may be communicatively connected to the communication network 106 to be able to send the fare information to or receive commands from other devices on the communication network. The transit stop may be a bus stop, a train station or stop, a shuttle stop, or any other designated location where a public transit vehicle picks up passengers.

A fare collection system is a device or set of devices that include hardware and software or firmware that can be configured to read or receive a fare from passengers who are boarding or getting off a vehicle at a transit stop and who bear a medium, collect a fare from the medium, and apply the fare to pay for passengers' usage of a public transit system. Examples of fare collection systems include card reading devices and other token reading devices, cash collection devices with money slots and/or coin slots, and the like, each of which may include or be communicatively connected to one or more processors. The fare collection system can be installed at an entrance or exit of the stop, or at the embarking or disembarking area of the stop, on the vehicle itself, or at another suitable location.

The fare collection system may include a token reader 108. In one embodiment, the token reader may include a data reading circuit that is capable of reading data off of the token. In one embodiment, the token reader may include a detecting circuit capable of detecting a token or other subject within a communication range, such as a RFID detector. The token reader may also include a computing device, and program instructions that are stored on a non-transitory computer-readable medium and that when executed, can cause the computing device to receive data from the data reading or detecting circuit. In one embodiment, the fare collection system may include a transceiver for receiving data from a transmitter of a token, a sensor that can sense when the token has been positioned in or near the reader within a detectable communication range of a receiver of the token reader, or a communication port that detects when the token has been inserted into the reader.

The computing device may be configured to receive passenger identity information from the token via token reader, and use the passenger identity information to generate fare information for the passenger. The computing device may include or have access to a data set 109 on the communication network that it can use when generating the fare information. For example, in one embodiment, the fare information may include a fare value that is indicative of the fare class of the passenger who uses the token. The computing device may generate the fare value by receiving the fare class from the token, looking up the fare value that corresponds to the fare class and the relevant stop in the data set, and using the discovered fare value as the fare value for that passenger.

The fare information may also include a fare amount reflective of the traveling distance of the passenger using the public transit system. The system may generate the fare amount by accessing the data set to determine when the passenger boarded the system, and upon exiting, generating a fare amount based on the distance or number of stops traveled, time of the day, and or other criteria. For example, in one embodiment, the computing device may also be configured to receive from the token reader a time stamp that records the time the passenger was boarding or getting off the transit system at the stop or when a passenger who bore a token is within a detectable communication range of a receiver of the token reader. The computing device may also be configured to validate a received fare value by verifying that a passenger has paid the fare based on the right fare class or the right fare amount. If a fare value is validated, the computing device may be configured to deduct the fare amount from the token or an account associated with the token.

In a non-limiting example, a passenger bears a token that is read by a token reader of the fare collection system at the transit stop. The fare collection system identifies the passenger identification or a passenger account associated with the token. The fare collection system may retrieve the fare class associated with the passenger identification from the data set (109 in FIG. 1), for example the student fare class associated with the passenger. The fare collection system may set the identified fare value as a fare value for the passenger, for example, a flat amount of $2.00 for all of the routes in the public transit system for student fare. In another example, the fare collection system may transmit the passenger identification information to the processing device 102, which may retrieve related information from the data set on the communication network, determine a fare value for the passenger.

In another example, each token reader of the fare collection system is associated with a transit stop, and the fare collection system or the processing device may determine the fare amount based on the fare class, the time of the day, and the number of transit stops the passenger has traveled. For example, the fare management system 105 may set the adult fare price at 30 cents per stop at non-peak time and 45 cents per stop at peak time, where the non-peak time may range from 8 pm to 6 am and 8:30 am to 4 pm; and the peak time may range from 6:01 am to 8:29 am and 4:01 pm to 7:59 pm. Such a fare table may be stored in the data set 109. If the passenger whose identity is associated with an adult fare has boarded the transit system during the peak time and traveled for 10 stops, the fare collection system or the processing device may retrieve the fare price from the data set and determine the fare amount by multiplying the price per stop by the number of stops traveled. In this example, the system may determine the fare amount to be 0.45×10=$4.50 and set this amount as the fare value for the passenger. In an embodiment, the system may allow a passenger who has a monthly pass to enjoy a non-peak rate at peak time, and in this case, the system may determine the fare amount for the passenger who has a monthly pass to be 0.30×10=$3.00.

Each of the fare collection systems 101, 103, 104 may also include a camera 107 positioned near the location where the token reader is installed and having a lens focused on a token reader area, and a computing device with an image processing software that is capable of analyzing a sequence of digital images of the token reader area as part of the fare validation. Each image will be associated with a time of capture so that the system can determine the number of passengers who are waiting at the stop at any given time.

In one non-limiting example, the computing device may detect a presence of a passenger in the token area and cross check whether a token is detected and fare information is being received from the token reader around the same time the passenger presence is detected. On the other hand, when a fare value is received from a token reader but no passenger presence has been detected from the sequence of images around the time the fare value is received from the token reader, the system may determine not to validate the fare value. In detecting passenger presence from the sequence of images, the system may do this using any suitable now or hereafter known image processing technique or sensor-based technique for motion detection.

Figure 2:
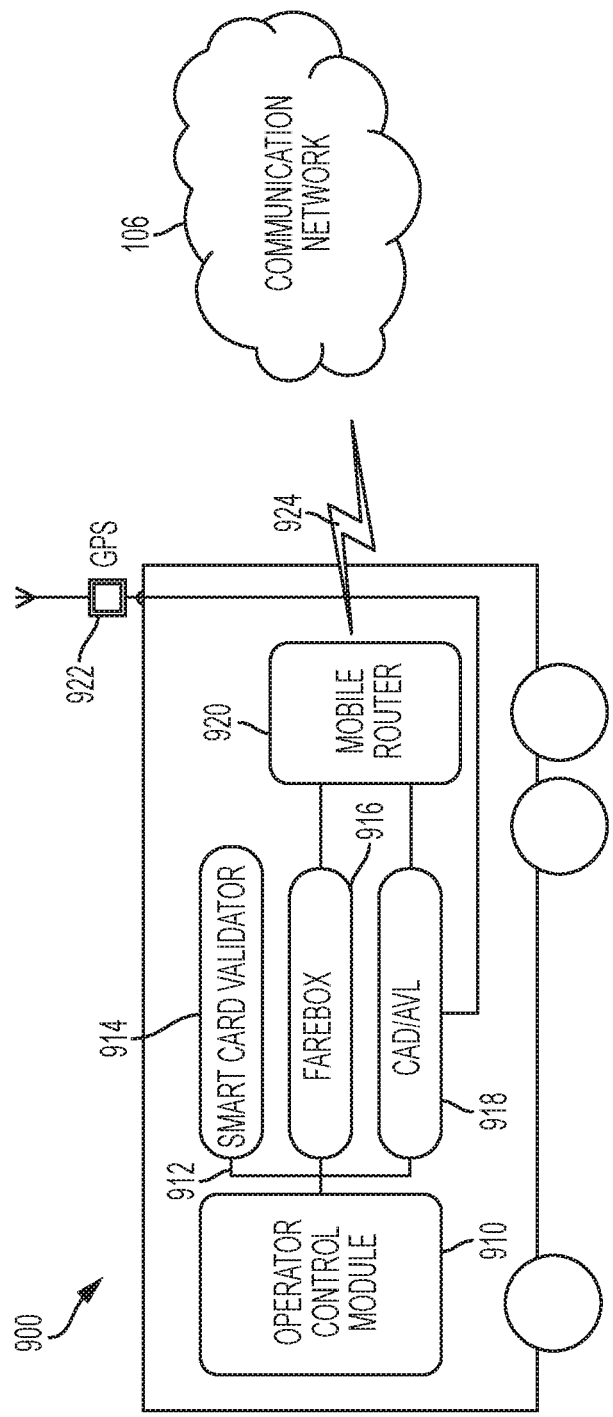
FIG. 2 depicts a fare collection system onboard a vehicle according to an embodiment.

Alternatively and/or additionally, the fare collection systems 101, 103, or 104 may also be installed onboard a vehicle, such as 900 in FIG. 2. The fare collection system may include a smart card validator 914 and/or a fare box 916 for receiving cash. The system may also include a computer-aided dispatch/automatic vehicle location system 918 that uses a GPS receiver 922 to determine the location of the vehicle and correlate the location of the vehicle to the payment received by the smart card validator or fare box. Fare information and other information associated with the payment can be transmitted to the communication network 106 through a wireless router 920 and a communication link 924 such as a 2G, 3G, 4G or later known cellular network or a Wi-Fi network. In addition, the system may also include an operator control module 910 that allows the vehicle operator to intervene the fare collection process as needed, such as notifying the system of an emergency stop so that the system may suspend fare collecting during the time of emergency.

The vehicles that has a fare collection system onboard may include rail, bus, paratransit access line (PAL) or other public transit means. The token or fare medium can be filled up with value through method of purchase, such as purchase at retailers, on the Web, at ticket vending machines (TVM), at point of sales (POS), through social service agencies, through a sponsor (employer or service organization), through a school (college), by a smartphone application, or other methods.

Returning to FIG. 1, the system 100 may also include a processing device 102 and a non-transitory, computer readable medium containing programming instructions that enable the processing device to receive data from the fare collection system 101, 103, 104 via the communication network 106, wired or wirelessly, analyze the data and generate a report for the user. The system may also include a fare management system 105, which is a processing device executes programming, or programming configured to cause a processing device, to control the allocation of fare classification, adjust the fare classification, and/or adjust the fare price. The report may provide insights of the fare system in terms of revenue generating. Public transit agencies offer a variety of fare classes, such as regular adult, monthly passes, children, students, etc. to satisfy various classes of demand. One certainly would expect that fares collected would at a minimum cover a constant portion of operating expenses. But thinking about them in terms of growth will provide additional insights to the public transit operators or agencies. In one embodiment, the upon viewing the report, an operator or agency may be allowed to cause the fare management system 105 to adjust the fare allocation or pricing based on the report.

For example, in one embodiment, the report may include a beta value associated with each fare class based on the fare information received from the fare collection systems over a period of time, where the beta value indicates the riskiness of each fare class in terms of generating revenue. For example, the riskiness can be classified as risky, indicating that the fare class may or may not be generating revenue but may potentially generate better than average market revenue in the long run; or classified as conservative, indicating that the fare class is generating but will be generating only moderate revenue. In one embodiment, the report may also include a return versus volatility chart that shows expected returns versus volatility for each fare class over a period of time. From the revenue generating perspective, a fare class with a lower volatility and a higher expected return is preferred.

In determining the beta value or the return versus volatility chart, in one embodiment, the system may apply a capital asset pricing model (CAPM). In the field of investment, CAPM is conventionally used to assess risk and volatility in a portfolio of investments. In short, let $r_t^f$ be the return of a "risk-free" investment at time t (say, US Treasury bonds) that would stand as a benchmark. Let $\bar{r}_t$ be the average market return at time t. And let $r_t^c$ be the return of a selected member of the portfolio. The CAPM model fits a linear regression model of the form, $$r_t^c - r_t^f = \alpha + \beta(\bar{r}_t - r_t^f) + \epsilon_t, \ \epsilon_t \sim N(0, \sigma^2), \ t=1, \ldots, n \qquad \text{Eq. (1)}$$

where parameter $\beta$ measures the relative risk and volatility of instrument c. If $\epsilon=1$, this instrument returns the market average. If β>1, the instrument is considered risky but likely to return better than the market average over the long term. If β<1, the instrument is conservative.

In general, $\hat{\alpha}=0$ (i.e., almost always not statistically significant), and β can be calculated by:

$$\beta = \frac{\text{cov}(r_t^c - r_t^f, \bar{r}_t - r_t^f)}{\text{var}(\bar{r}_t - r_t^f)} \qquad \text{Eq. (2)}$$

which emphasizes the interpretation as a measure of how volatile the investment c is compared to the market average. The expected return for each investment c can be computed by:

$$E(r_t^c) = E(r_t^f) + \beta(E(\bar{r}_t) - E(r_t^f)) = \beta E(\bar{r}_t) + (1-\beta)E(r_t^f) \qquad \text{Eq. (3)}$$

Under this model, the expected return is indicative of a tradeoff between market average returns and risk-free investing.

Figure 3:
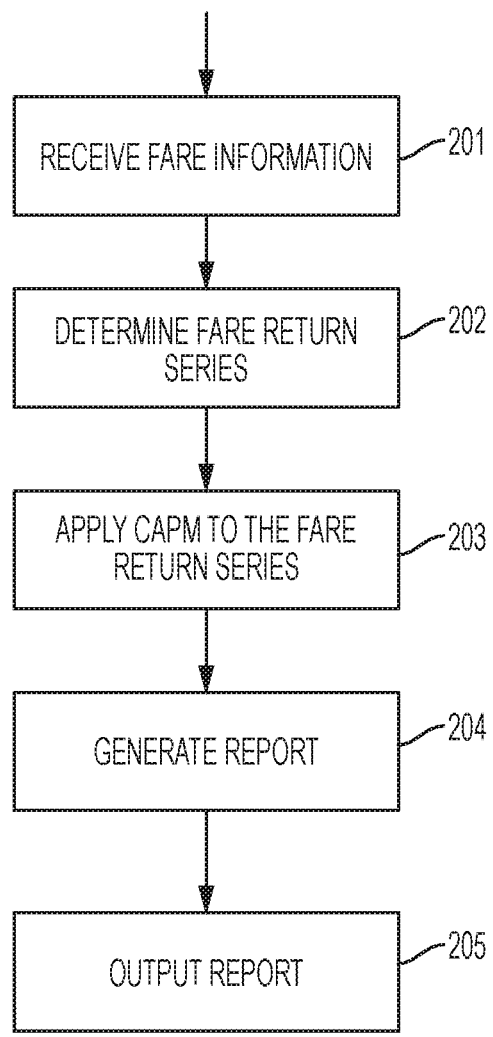
FIG. 3 depicts a diagram of applying a Capital Asset Pricing Model (CAPM) in a system according to one embodiment.

With reference to FIG. 3, in one embodiment, the system may adopt the CAPM in determining the riskiness and return versus volatility for each fare class, with respect to revenue generating by: receiving fare information 201 from one or more fare collection systems over a period of time, determining fare return series 202 over the period of time based on the received fare information. A fare return series includes a series or plurality of fare returns over a period of time, each fare return representing a member of a classification in the fare system. For example, a fare return series can include a plurality of fare returns, each representing a fare return for each fare class, which will be described further. In determining the riskiness and return versus volatility for each fare class, the system may further apply a capital asset pricing model to the fare return series 203, generate a report 204, output the report 205 by printing, saving it to a data file, or displaying on a display, etc. In one embodiment, the report may include a beta value indicating the riskiness of each fare class. The report may also include a return versus volatility value for each fare class. Details of determining the beta value and return versus volatility value will be further explained.

The fare classification system in a public transit network can be treated as a portfolio, in which each fare class or fare medium is an investment. Fares can be segmented by route, and considerable effort and expense is spent in planning and implementing a route. All the routes taken together can constitute a portfolio of investments that can be analyzed. It is important to analyze these investments, whether a fare classification, a fare medium or a fare route, to understand which ones are tapping into a reliable and stable revenue stream.

In one embodiment, the CAPM model depends on the returns on investments, which can be represented by a fare return for each fare class in the fare classification. In one embodiment, the fare return for each fare class c can be a normalized difference rate of fare change, $$r_t^c = \frac{x_t^c - x_{t-1}^c}{x_{t-1}^c} \qquad \text{Eq. (4)}$$

where $x_t^c$ is a count/ridership or validation of fares of a certain class c over a given time period. In one embodiment, the given time period can be a week. In another embodiment, the given time period can be a month, or three months or six months. The fare return, or the normalized rate of fare change measures a fare validation change from a previous time interval to the current time interval relative to the fare validations in the previous time interval. This can be explained in that if one is to invest x, one would expect to have x(1+r) in the next time interval. So, if the system goes from $x_{t-1}$ to $x_t$ that will represent the change as a return, $$x_{t-1}(1+r)=x_t$$

$$x_{t-1}r=x_t-x_{t-1}$$

$$r=(x_t-x_{t-1})/x_{t-1}.$$

To adopt the CAPM, because most passengers who ride a public transit route or system will pay a fare, in one embodiment, the system may determine a "risk-free" return as $$r_t^f=(N_t-N_{t-1})/N_{t-1} \qquad \text{Eq. (5)}$$

where $N_t$ is the total number of passengers in the entire system summed over any given time period, such as a week. This return represents the base level return of the entire revenue system. In other words, if there were no fare classifications, this is what one would expect. Also, it captures the time to time change (such as week to week) in ridership and the passengers using a fare class contribute to a portion of the return.

To adopt the CAPM, to determine a market average, as a surrogate, the system may use the average return over all the fare classes, $$\bar{r}_t = \frac{1}{C}\sum_{c=1}^{C} r_t^c \qquad \text{Eq. (6)}$$

where C is the total number of fare classes. With the fare return, the risk-free return and market average explained, adapting the CAPM to the public transit network can be further explained.

Returns may also refer to revenue generated per ride. A given fare class may have a value that is determined by the number of uses. For example, a 31-day adult pass may cost $56. If that pass is used during the work week to go to work and return, each way requiring a transfer, for a 20-day work month, that results in 80 trips at $0.70 per ride. Yet another passenger may only use such a pass three times a week for four weeks with no transfers, with a variable number of ad hoc trips, say, an additional 16 trips, resulting in 28 trips at $2 per trip. This particular customer values the convenience of using a pass and not having to carry correct change to travel. Revenue per ride adds variability introduced by usage and fare product purchases that are analyzed as described above.

Revenue per ride fares that are classified as risky with low expected returns can be restructured to allow roll-overs of card value if not enough trips have been taken or discounts for off-peak travel.

Figure 4:
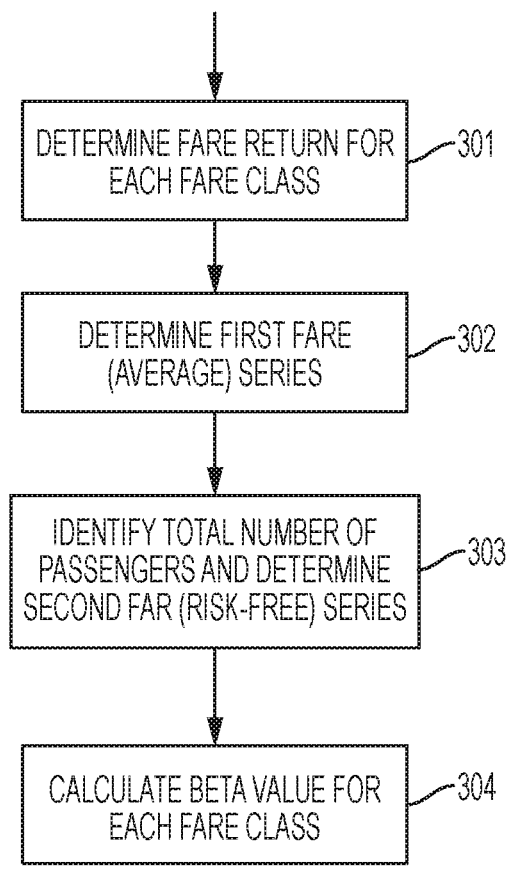
FIG. 4 depicts a diagram of a process for generating a return versus volatility chart in a system according to one embodiment.

With reference to FIG. 4, in determining a beta value that is indicative of riskiness of a fare class with respect to revenue generation, in one embodiment, the system may be configured to apply the CAPM to the fare return series in the public transit system by: determining a fare return for each fare class 301 by identifying a portion of the fare return series pertaining to each fare class of the plurality of fare classes. In one embodiment, the system may determine a fare rate change from a previous time period to the current time period and determine the proportion of the fare rate change relative to the fare in the previous time period (see Eq. (4)). In applying the CAPM to the fare return series, the system may further determine a first fare (average) series 302 based on averaging the fare returns across all fare classes of the plurality of fare classes (see Eq. (6)); identify a total number of passengers over a time period from the fare return series over the time period and determine a second fare (risk-free) series 303 based on the total number of passengers over the time period (see Eq. (5)); and calculate a beta value for each fare class 304 based on the fare return for the fare class, the first fare series and the second fare series (see Eq. (2)).

In one embodiment, the system may calculate the beta value for each fare class based on Eq. (2), i.e.

$$\beta = \frac{\text{cov}(r_t^c - r_t^f, \overline{r_t} - r_t^f)}{\text{var}(\overline{r_t} - r_t^f)} \quad \text{Eq. (7)}$$

where cov is the covariance of random variables in Eq. (7) indicating how two variables, e.g. fare return subtract risk-free (or fare return subtract the second fare series) and average subtract risk-free (or the first fare series subtract the second fare series), change together; var is the variance of a random variable in Eq. (7) indicating how far a set of numbers, e.g. average subtract risk-free (or the first fare series subtract the second fare series), are spread out from their mean.

Returning to FIG. 3, in generating the report including a return versus volatility value for each fare class, the system may determine an expected return value for each of the plurality of fare classes based on the beta value for each fare class, the average return (the first fare return series) and the risk-free return (the second fare series) (see Eq. (3)), and determine a volatility value for each of the plurality of fare classes based on a standard deviation of the fare return for each fare class.

Figure 5:
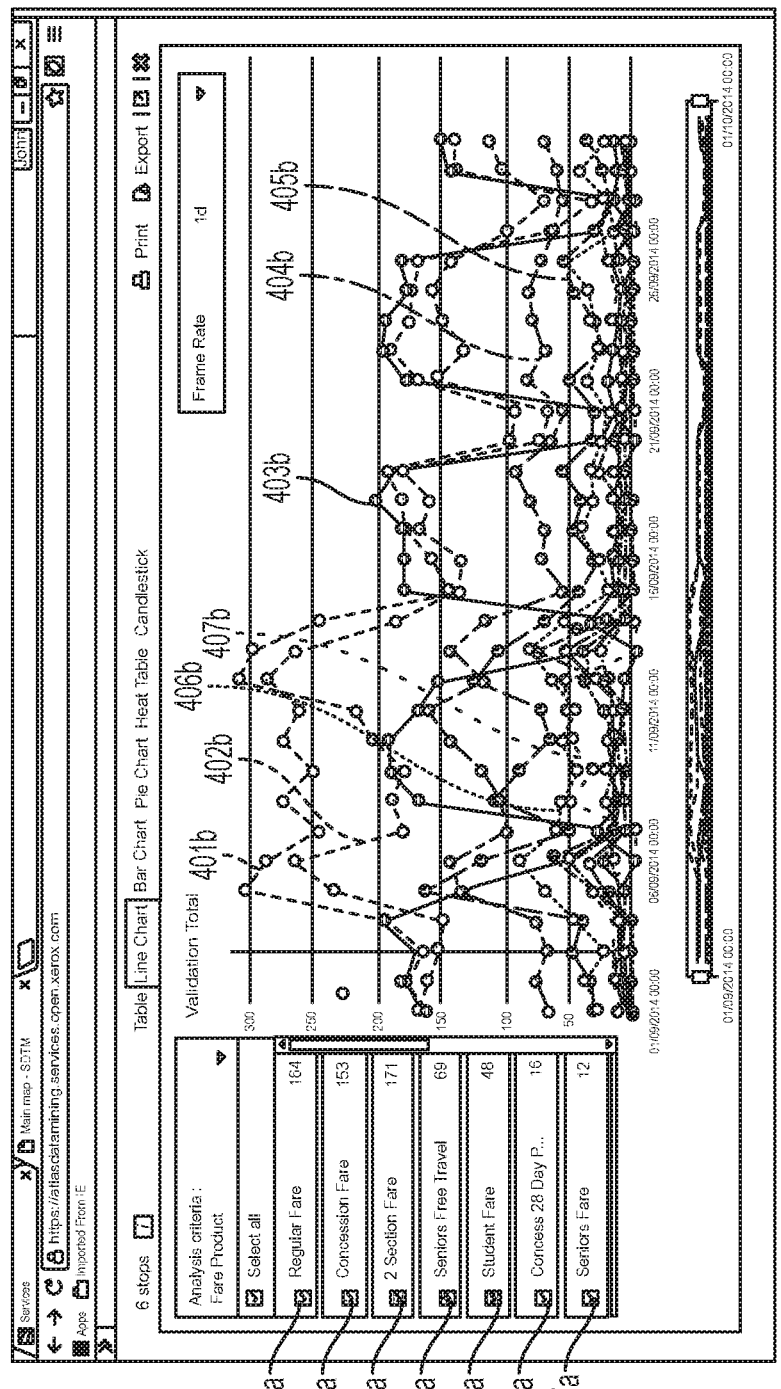
FIG. 5 depicts an example of fares summed over multiple stops in a time series in a public transit system according to an embodiment.

With reference to FIG. 5, a fare return series based on fare information collection from a public transit system that includes six stops is shown. The system has multiple fare classes 401a, 402a, 403a . . . 407a, for each of which a fare return is shown in the plot 401b, 402b, 403b . . . 407b.

Figure 6:
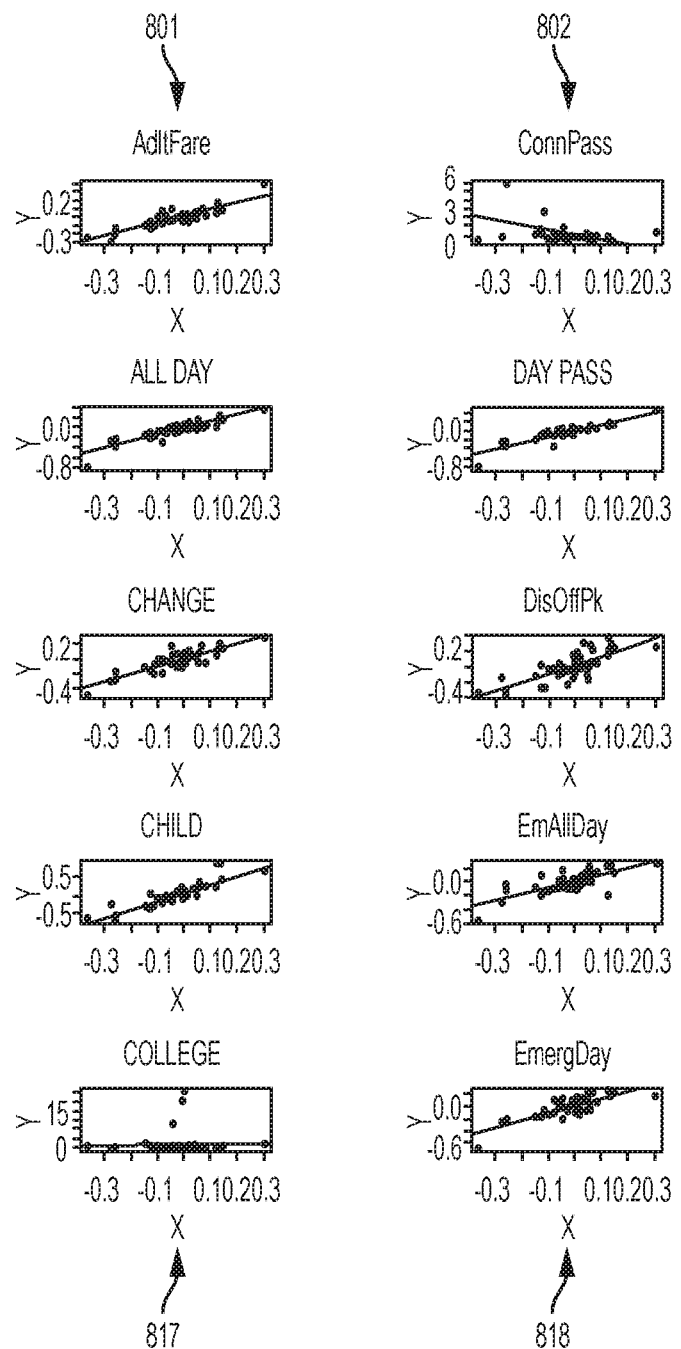
FIG. 6 depicts an example of CAPM fits for multiple fare classes according to an embodiment.
Figure 6:
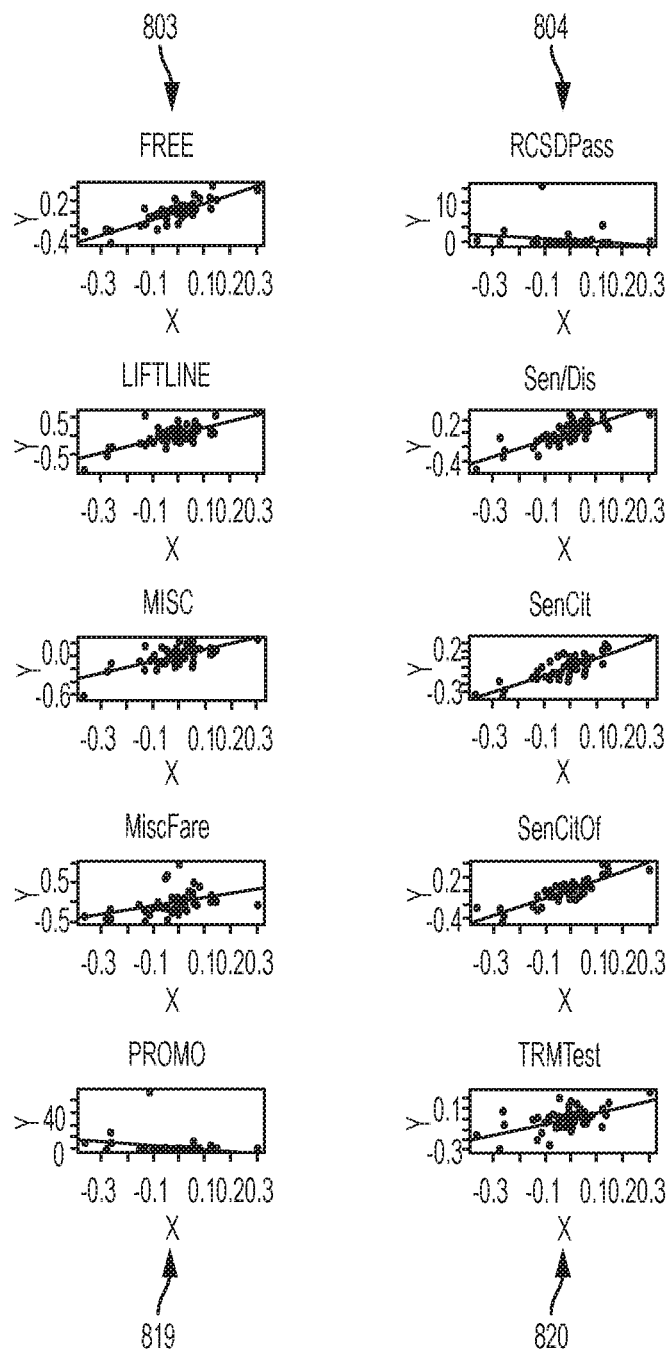

With reference to FIG. 6, a total ridership or fare validation data for twenty fare classes from a regional transit service for a period in 2014 are summed over each week and fit for the CAPM. In one embodiment, the ridership/fare validation data is determined based on the fare information received from one or more token readers, in that the total number of passengers whose fares have been validated are added per fare class. In each chart of FIG. 6, 801, 802, 803, . . . 820, the ridership/fare validation for each of the twenty fare classes is shown. In one embodiment, before the total ridership data is determined, the collected fare information for the first and last period, such as the first and last week of the year, are removed to avoid partial weeks.

With reference to Table 1 below, the beta values and expected returns for each of the twenty fare classes using the methods described in various embodiments in FIGS. 1-4, are shown. Most of the fare classes show a beta value near one, which indicates a tracking of the average. When the expected return for a fare class is negative, it indicates decreasing revenue from the offerings. In one embodiment, the fare classification in the public transit system can be adjusted based on the calculated beta values and expected returns. For example, if the beta value for a fare class exceeds a threshold, such as 1.0, 1.1, 1.2 or 1.3, the fare class may be considered risky but likely to return better than the market average over the long term. In another example, if the beta value for a fare class goes below a threshold, such as 1.0, 0.9, 0.8 or 0.7, the fare class may be considered conservative or underperforming. In another example, if the beta value for a fare class becomes negative or significantly lower than zero, such as the connection passes, promotions, and school passes in Table 1, the data for the fare class may be considered an anomaly and will not be considered in the calculation of beta values and return versus volatility chart for the report.

TABLE 1

Estimated beta values and expected returns for twenty fare classes.

| Fare Class | Beta | Expected Return |
| --- | --- | --- |
| AdltFare | 0.814 | −0.008 |
| All Day | 1.374 | −0.017 |
| Change | 1.003 | −0.011 |
| Child | 2.313 | −0.032 |
| College | 1.355 | −0.016 |
| ConnPass | −5.156 | 0.09 |
| Day Pass | 1.317 | −0.016 |
| DisOffPk | 1.168 | −0.013 |
| EmAllDay | 0.924 | −0.009 |
| EmergDay | 1.193 | −0.014 |
| FREE | 1.309 | −0.016 |
| LIFTLINE | 1.626 | −0.021 |
| Misc | 0.924 | −0.009 |
| MiscFare | 1.034 | −0.011 |
| Promo | −32.39 | 0.535 |
| RCSDPass | −5.199 | 0.091 |
| Sen/Dis | 1.218 | −0.014 |
| SenCit | 1.038 | −0.011 |
| SenCitOf | 1.302 | −0.016 |
| TRMTest | 0.504 | −0.002 |

Figure 7:
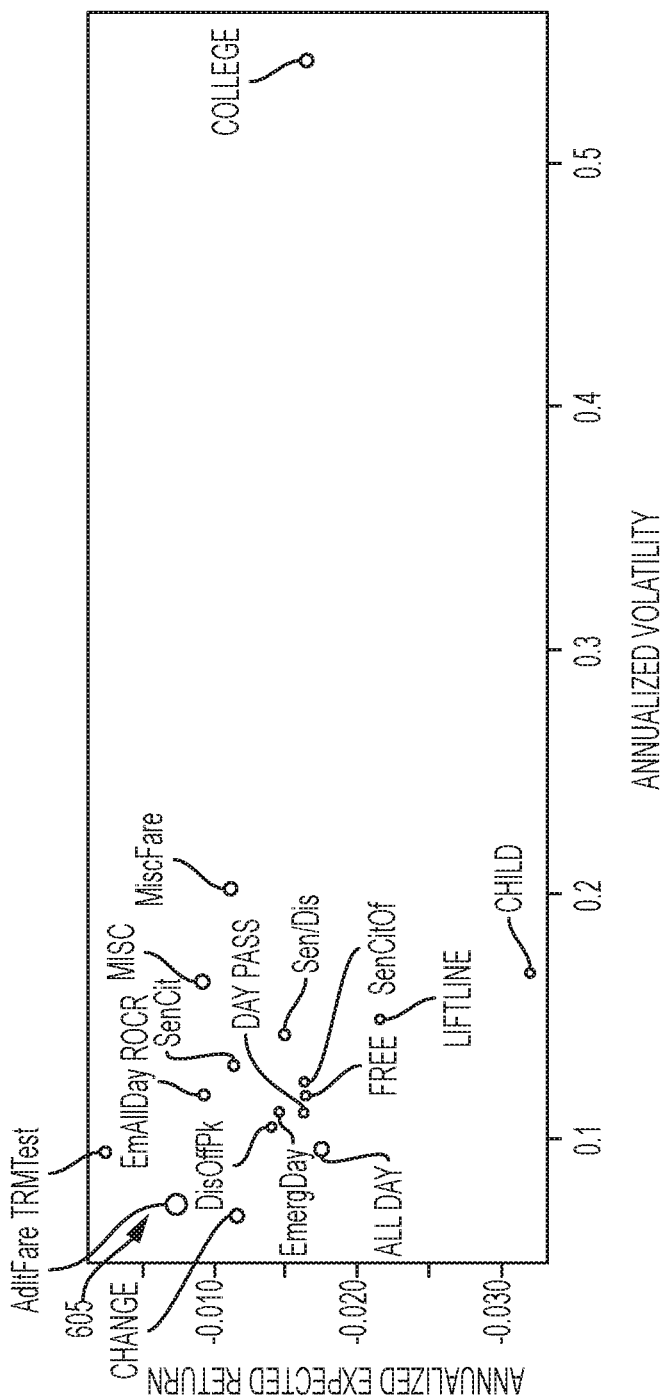
FIG. 7 depicts an example of return versus volatility chart for a public transit system according to an embodiment.

With respect to FIG. 7, a portfolio risk versus return chart that includes an annualized expected return versus volatility value for each fare class, is shown as part of the report. In one embodiment, each fare class is placed in the portfolio risk versus return chart based on the expected return value and standard deviation of returns for that fare class. Each fare class may also be represented by a disk/dot, the size of which indicates relative number of fare validations for each fare. For example, AdultFare 605 has the biggest ridership among the fare classes and has the greatest average return and lowest risk, even outperforming the total passenger counts. This indicates it is relatively successful compared to the other offerings in other fare classes.

Alternatively, and/or additionally, the system described in various embodiments in FIGS. 1-4 may include a graphical user interface that allows the user to select ranges of fare time series and time bins and view the beta values or return versus volatility of various fare classes within the selected range. For example, a user may select to view the return versus volatility chart within a span of few weeks or few months (time series). In another example, a user may select to add the fare validations for each fare class by week or by month (time bin).

Alternatively, and/or additionally, the system may improve the public transit network based on the calculated beta values, expected returns, and/or return versus volatility values for each fare class. For example, the system may determine that certain fare classes are risky and cause the fare management system (105 in FIG. 1) to modify the fare classification or portfolio by eliminating those fare classes or combining some fare classes with other risky fare classes to produce a less risky fare class. The system may also cause the fare management system to change fare prices for certain risky fare classes.

In another example, the system may determine that certain fare media are risky compared to their expected returns and eliminate those fare media by refusing to accept types of fare media that are classified as risky. In another example, the system may determine that certain routes are risky compared to their expected returns, and cause the fare management system to restructure the route to match schedules to actual ridership patterns. The system may restructure the fare medium by increasing the number of trips and vehicles or increasing the number of stops.

In other examples, the system may change the fare classification and segment fares differently or combine different classifications. For example, the system may change the fare classification to include a day pass on certain days, or a day pass using NFC on route 10, or a 10-day pass or a long weekend pass around a holiday or a sports event.

In another example, the system may determine that certain fare classes, fare medium or routes are risky and, change or combine the risky revenue streams to reduce the variability. Several risky classes may wobble greatly, and the sum of those classes may become less wobbly proportionally. Or, the system may eliminate a risky instrument such as a class or a route, while anticipating that the demand goes to the other instruments.

Figure 8:
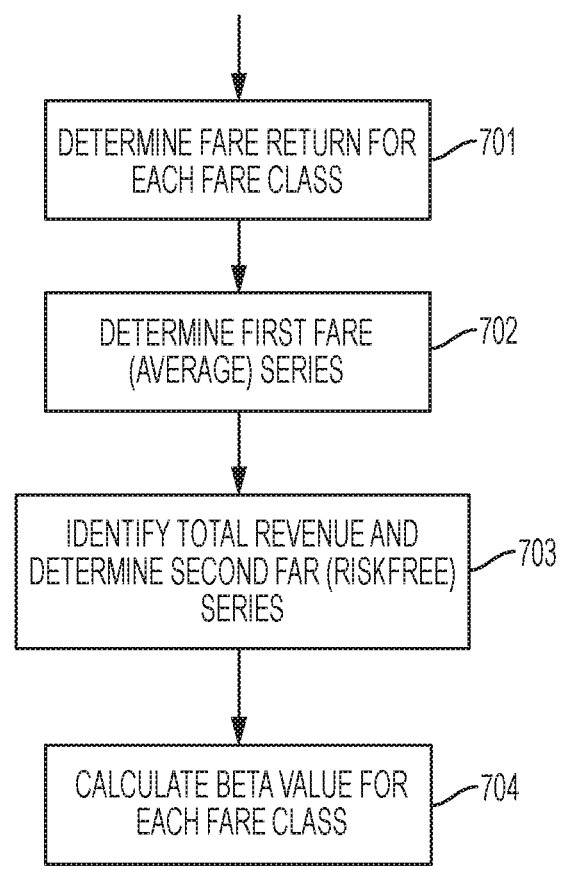
FIG. 8 depicts a diagram of generating a return versus volatility chart in a system according to one embodiment.

With reference to FIG. 8, alternatively and/or additionally, the embodiments described in FIGS. 1-4 may use actual revenue instead of fare validation (ridership) to get a more realistic return on the fare classifications. In one embodiment, the system may determine the beta value for each fare class by determining a fare return for each fare class 701 by identifying a portion of the fare return series pertaining to each fare class of the plurality of fare classes. The system may further determine a first fare series (average return) 702 based on averaging the fare returns across all fare classes of the plurality of fare classes (see Eq. (6)); identify a total revenue over a time period from the fare return series over the time period and determine a second fare series (risk-free return) 703 based on the total revenue over the time period (see Eq. (5)); and calculate a beta value for each fare class 704 based on the fare return for the fare class, the first fare series and the second fare series (see Eq. (2)).

In determining the total revenue over a time period, in one embodiment, the system may determine the ridership or fare validations for each fare class over the time period and multiply the ridership by a predetermined base fare that is associated with each fare class. In another embodiment, the system may determine the ridership or fare validations for each fare class over the time period, individually calculate a fare amount for each ridership or fare validation based on the distance traveled, the time of the day and the geographical zone (by grouping multiple stops) for each ride/validation, and add the fare amount for all rides associated with each fare class over the time period.

In a non-limiting example, in calculating revenue, the transit agency issues fare cards to be used for riding the public transit system, in which each leg of a trip has a cost. A fare collection system may detect when a rider gets on, and when that happens, the system may allocate or debit the rider's account by an amount. The system may determine the revenue based on the fare collected (or allocated) subtract cost per trip taken. The fare collection system may upload the ridership and fare data to the processing device (e.g. 102 in FIG. 1) in the system via a communication network, such as a Wi-Fi network. The system may determine the total revenue based on the revenue per trip for all trips taken within a time period, such as six months or a year.

Figure 9:
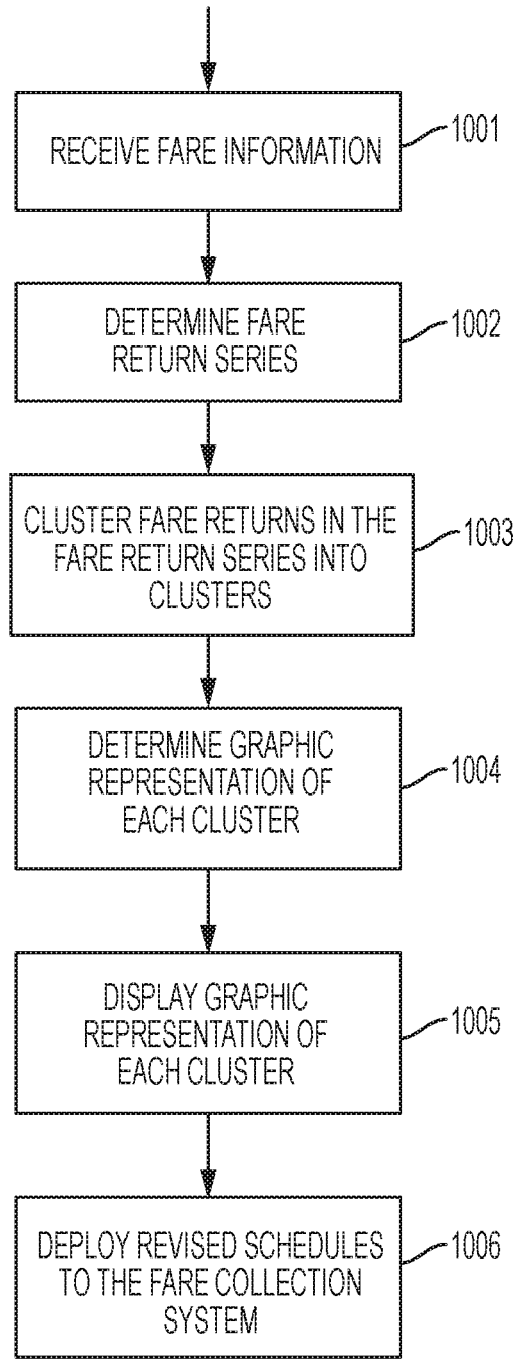
FIG. 9 depicts a diagram of using clustering results to display graphic representations of the fare return series according to one embodiment.

Additionally, or alternatively, the system may apply clustering to the fare return series and cause the electronic display device to display certain graphic representations or cause the fare management to perform certain functions in the public transit network based on the clustering results. In one embodiment, in FIG. 9, the system receives the fare information 1001, determines the fare return series from received fare information 1002 (as disclosed above in embodiments of FIG. 3), and clusters the fare returns in the fare return series into multiple clusters 1003. The system also determines a graphic representation for each cluster 1004 and displays the graphic representation of each cluster on an electronic display device 1005. The system may also deploy revised schedules to the fare collection system 1006 based on the clustering results. These steps will be illustrated by way of example in FIGS. 10-13.

Figure 10:
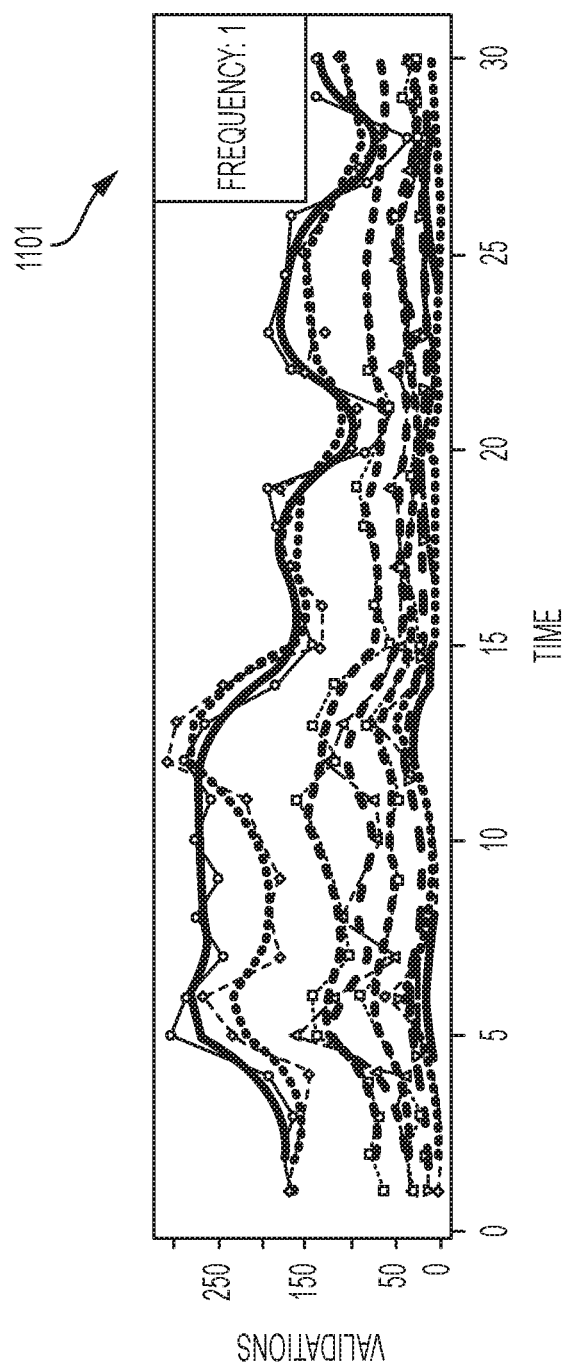
FIGS. 10-12 illustrate examples of clustering and graphic representations of fare return series according to various embodiments.
Figure 10:
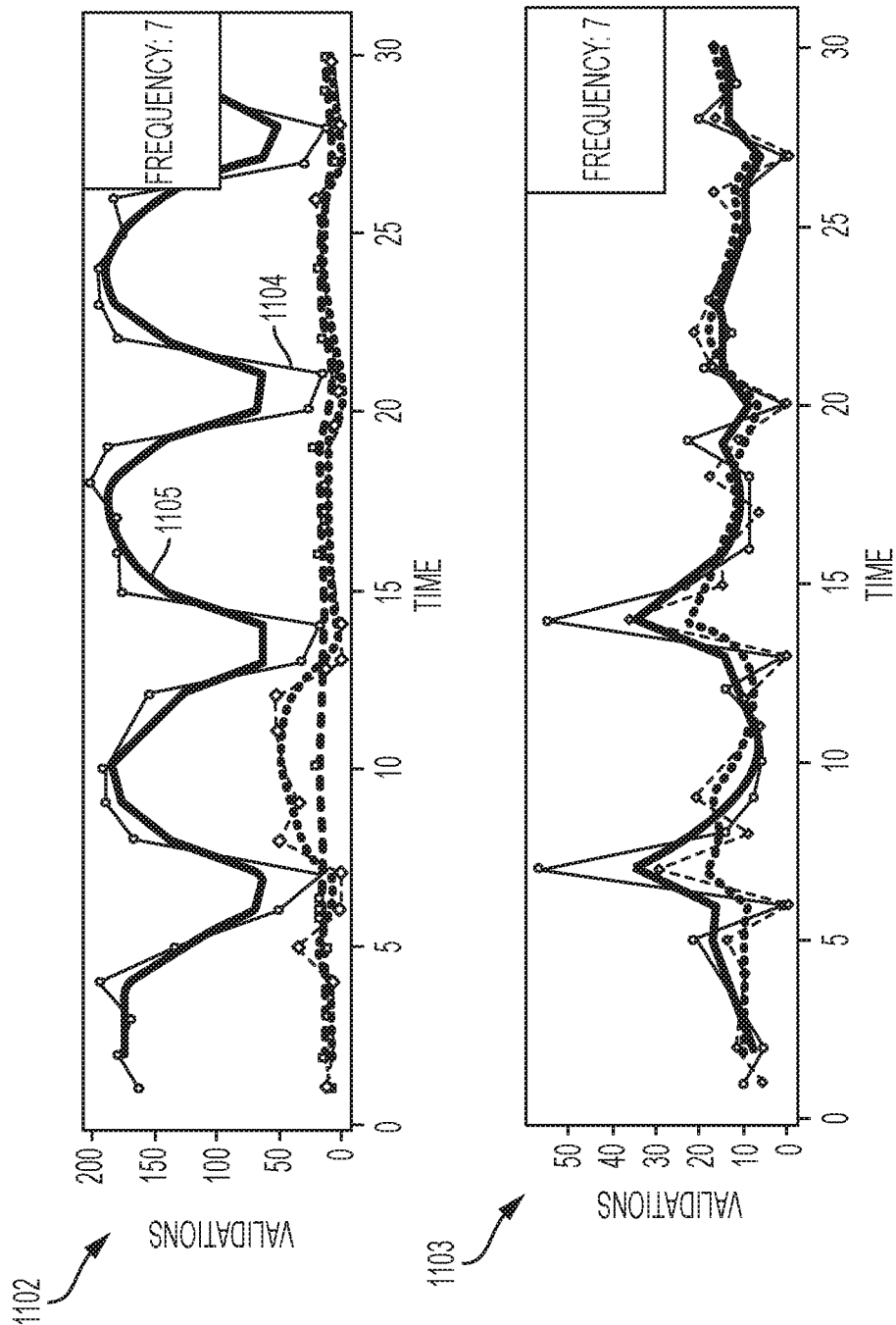

In FIG. 10, the system clusters multiple fare returns in the fare return series into three clusters 1101, 1102, 1103, each containing multiple fare returns with similar behaviors, and determine various graphic representations for display. For example, in FIG. 10, the system may determine a trend line for each fare return in the clusters, where each trend line smooths out the variations in the corresponding fare return. For example, for fare return 1104, the system may determine its trend line 1105 and overlays the trend line on the original fare return. There are various ways of determining the trend line for a particular fare return. For example, the system may apply a sliding window centered at each sample in the fare return 1104 over the entire time span, and replace the value of each sample with an average value of all of the samples within the sliding window. The larger the size of the window is, the smoother the trend line may be. In another example, the system may use a Kalman smoother to estimate the trend line.

Figure 11:
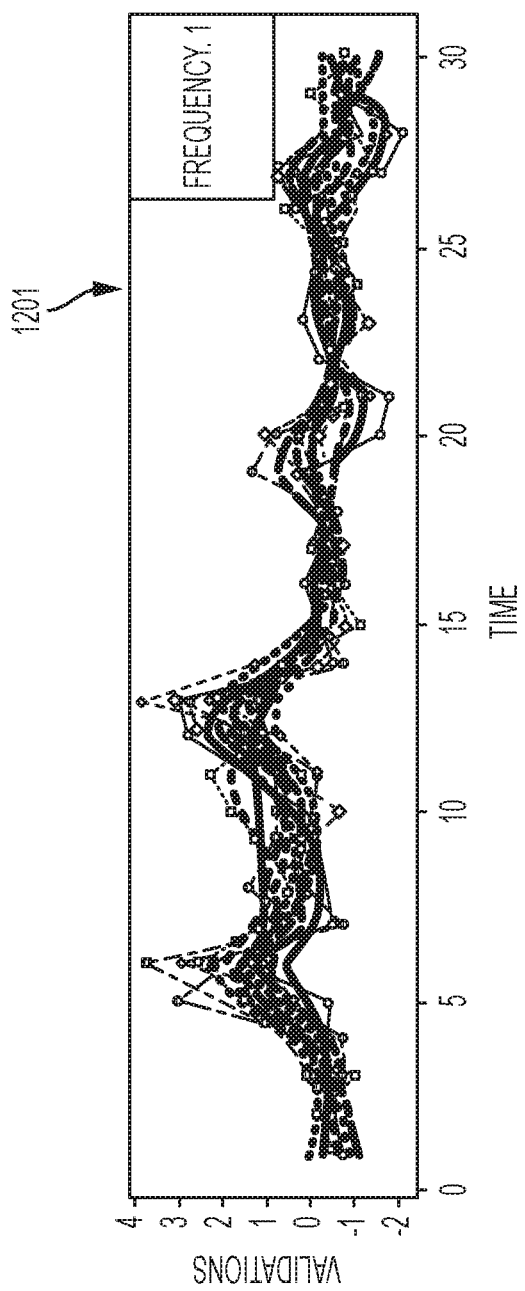
Figure 11:
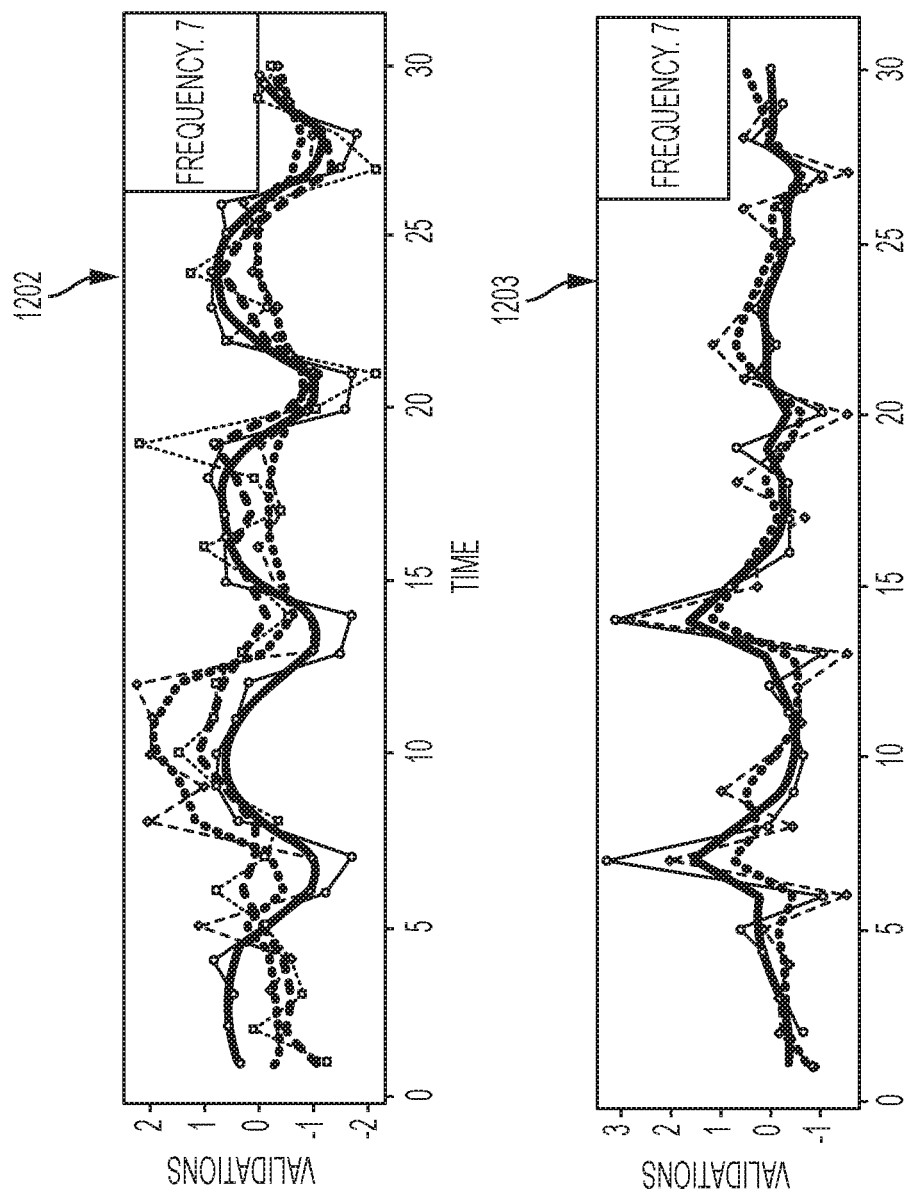

FIG. 11 illustrates another example of graphic representation, in which the system scales all of the fare returns in each cluster 1201, 1202, 1203 and their trend lines, and overlay these scaled lines altogether to emphasize behaviors over magnitude. In scaling each fare return or trend line, the system may simply determine the maximum and minimum values of all the lines in each cluster and normalize these lines by their maximum and minimum values.

Figure 12:
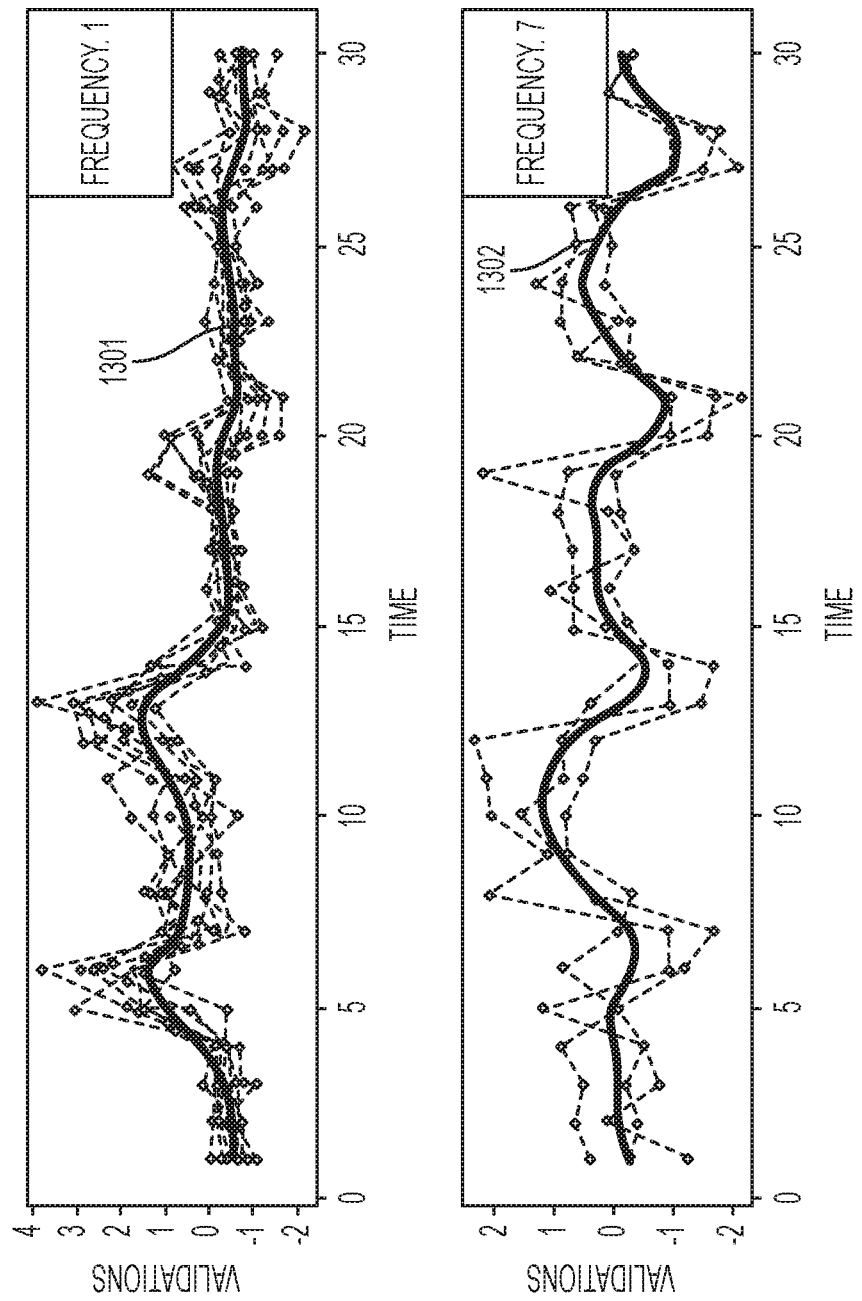
Figure 12:
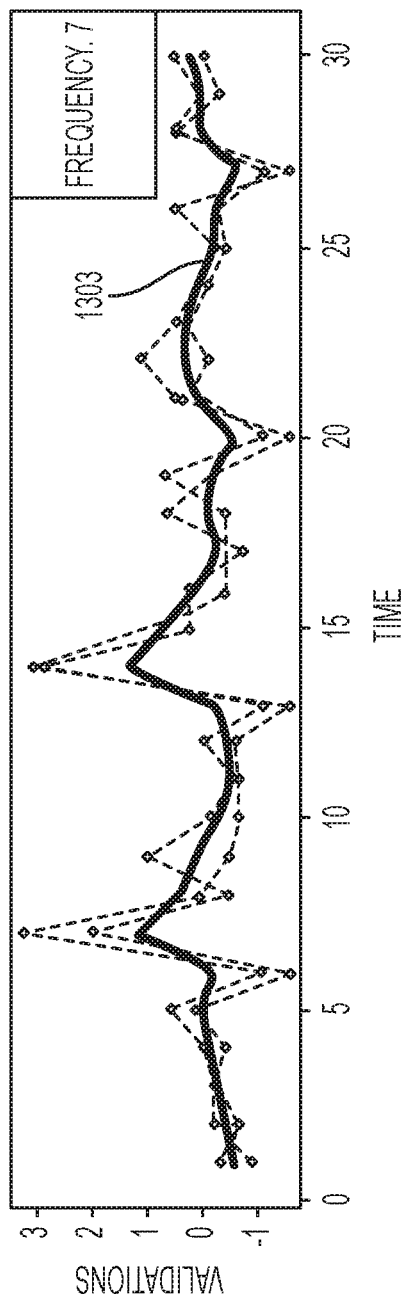

FIG. 12 illustrates another example of graphic representation, in which the system may determine an aggregated trend line for each cluster 1301, 1302, 1303. In calculating the aggregated trend line for each cluster, the system may, for example, combine all of the scaled fare returns in each cluster (as shown in FIG. 11) by averaging the scaled fare returns to determine the trend line for the cluster. The system may also average the trend lines for each fare return (as shown in FIG. 10) and determine the trend line for the cluster.

Figure 13:
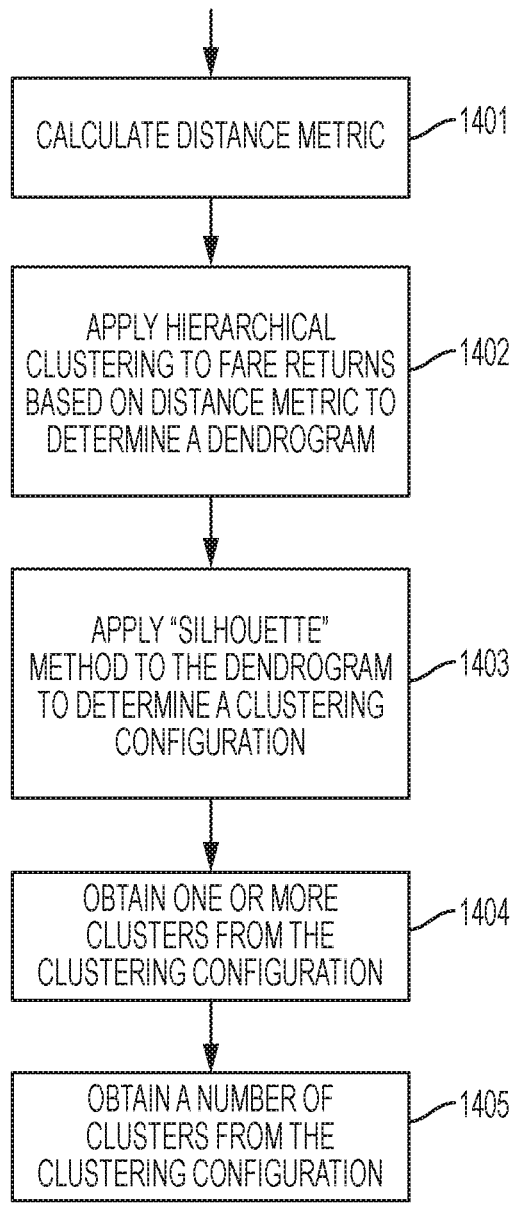
FIG. 13 depicts a diagram of a process of clustering according to one embodiment.

Returning to FIG. 9, in step 1003, the system may use various clustering techniques to cluster fare returns in the fare return series into clusters. For example, FIG. 13 shows an example of a process of clustering the fare returns. In one embodiment, the system may calculate a distance metric 1401 that includes the distance between each fare return and all other fare returns in the fare return series, apply hierarchical clustering to the fare returns to determine a dendrogram based on the distance metric 1402, where the dendrogram includes multiple clustering levels or heights, each representing a clustering configuration that includes one or more clusters of fare returns. The system may also apply a "silhouette" method to the dendrogram to determine a clustering configuration 1403, obtain one or more clusters from the clustering configuration 1404 and obtain the number of clusters from the clustering configuration 1405.

In calculating the distance metric 1401, the system may calculate a fare return to fare return pair-wise distance based on the correlation between the two fare returns. For example, given two fare returns (e.g., of fares per week or ridership per month, etc), $\{x_t, t=1, \ldots, n\}$ and $\{y_t, t=1, \ldots, n\}$, the correlation between the two is calculated as $$\rho_{x,y} = \frac{\sum_{t=1}^{n}(x_t - \bar{x})(y_t - \bar{y})}{\sum_{t=1}^{n}(x_t - \bar{x})^2 \sum_{t=1}^{n}(y_t - \bar{y})^2}.$$

This value ranges between −1 and 1. If the two fare returns were identical, then $\rho_{x,y}=1$. If the two fare returns were unrelated (i.e., uncorrelated) then $\rho_{x,y}=0$. If the two fare returns move in opposite directions (i.e., one moves up vs. time, and the other moves down, or vice versa), then $\rho_{x,y}=-1$. The system may use the correlation to determine the distance between two fare returns by subtracting correlation from value one, that is, the distance between two fare returns is $d(x, y)=1-\rho_{x,y}$. It two fare returns are the same, then the distance between them is zero.

The calculation of distances for fare return pairs will produce a symmetric matrix that contains the distance between each fare return and each of all other fare returns in the fare return series, where the size of the matrix is the number of fare returns in the fare return series. For example, consider a set six fare returns of weekly fares. The distance matrix for this set of six fare returns is:

| | $3.00 All Day Pass | Adult Cash Fare | Child Discount Fare | College/ University | Connection Pass | DAY PASS |
|---|---|---|---|---|---|---|
| $3.00 All Day Pass | 0.000 | 0.151 | 0.538 | 0.890 | 0.310 | 0.214 |
| Adult Cash Fare | 0.151 | 0.000 | 0.697 | 0.718 | 0.262 | 0.317 |
| Child Discount Fare | 0.538 | 0.697 | 0.000 | 1.108 | 1.036 | 0.606 |
| College/ University | 0.890 | 0.718 | 1.108 | 0.000 | 0.576 | 1.023 |
| Connection Pass | 0.310 | 0.262 | 1.036 | 0.576 | 0.000 | 0.488 |
| DAY PASS | 0.214 | 0.317 | 0.606 | 1.023 | 0.488 | 0.000 |

Alternatively, the system may use other distances to calculate the distance matrix, such as Euclidean distance.

In applying hierarchical clustering to the fare returns 1402, in one embodiment, the system may use, for example, a hierarchical agglomerative clustering ("bottom-up") approach, under which each fare return starts in its own cluster and pairs of clusters are merged as one moves up the hierarchy. Generally, the results of hierarchical clustering can be presented in a tree-like diagram such as a dendrogram, which includes multiple clustering levels or heights, each representing a clustering configuration that includes one or more clusters of fare returns.

In determining the clustering configuration 1403, the system may apply the known "silhouette" method to the dendrogram to determine whether a particular clustering in the dendrogram is appropriate, in other words, whether a fare return is matched to its own cluster as compared to other clusters. Particularly, for each fare return in a clustering configuration, the system may calculate a "silhouette" value based on a measure of average distance to each of other fare returns in the same cluster a(x), and a measure of average distance of each fare return to other fare returns in its closest (neighboring) cluster in the dendrogram b(x). The value of a(x) indicates how well a fare return is assigned to its cluster—a smaller value means that a fare return is well matched to its own cluster. The value of b(x) indicates how bad a fare return is matched to its neighboring cluster, and a large value means that it is badly matched to its neighboring cluster.

A "silhouette" value s(x) can be defined as the difference between b(x) and a(x) normalized by the maximum value of the two, i.e. s(x)=[b(x)-a(x)]/max(a(x), b(x)). Thus, a "silhouette" value is a measure of how similar an fare return is to its own cluster compared to other clusters. As such, if the "silhouette" value is about one, the system may determine that the given clustering configuration is appropriate. If the "silhouette" value is near zero, the system may determine that the fare return is on the border of the two clusters. If the silhouette value is close to negative one, the system may determine that it would be more appropriate if the fare return is clustered to its neighboring cluster, and the system may accordingly examine other clustering configurations in remaining clustering levels or heights in the dendrogram.

As an example of applying "silhouette" method 1403, the system may obtain the clustering configuration based on average "silhouette" values. For example, the system may calculate an average silhouette value for one or more clustering levels in the dendrogram based on the "silhouette" values for each fare return, and identify clustering configuration that corresponds to a clustering level in the dendrogram and that has the highest average "silhouette" value as the optimal clustering. Subsequently, the system may obtain the one or more clusters from the optimal clustering configuration 1404 and an optimal number of clusters 1405, which is the number of clusters in the optimal clustering configuration.

Returning to FIG. 9, the system may optionally use the clustering result to revise a schedule and deploy the revised schedule to the fare collection system 1006. The schedule may be a fare class schedule, which includes multiple fare classes; a transit route schedule, which includes multiple routes; or a transit stop schedule, which includes multiple transit stops in the public transit network. In one embodiment, based on the clustering results, the system may decide to revise the fare class schedule by deleting or merging a fare class. For example, the system may select one of the clusters that contains one or more fare classes, revise the fare class schedule to eliminate one of the fare classes in the selected cluster and replace the eliminated fare class with one of the fare classes remaining in the selected cluster. In one example, the system may identify a fare class that has a lowest fare return than all other fare classes in the cluster, and eliminate the identified fare class.

Alternatively, and/or additionally, the system may decide to revise the transit route schedule by deleting or merging a particular transit route. For example, the system may select one of the clusters that contains multiple transit routes, revise the transit route schedule to eliminate one of the transit routes in the selected cluster and replace the eliminated transit route with one of the transit routes remaining in the selected cluster. In another example, the system may select one of the clusters that contains multiple transit stops, revise the transit stop schedule to eliminate one of the transit stops in the selected cluster and replace the eliminated transit stop with one of the transit stops remaining in the selected cluster.

Figure 14:
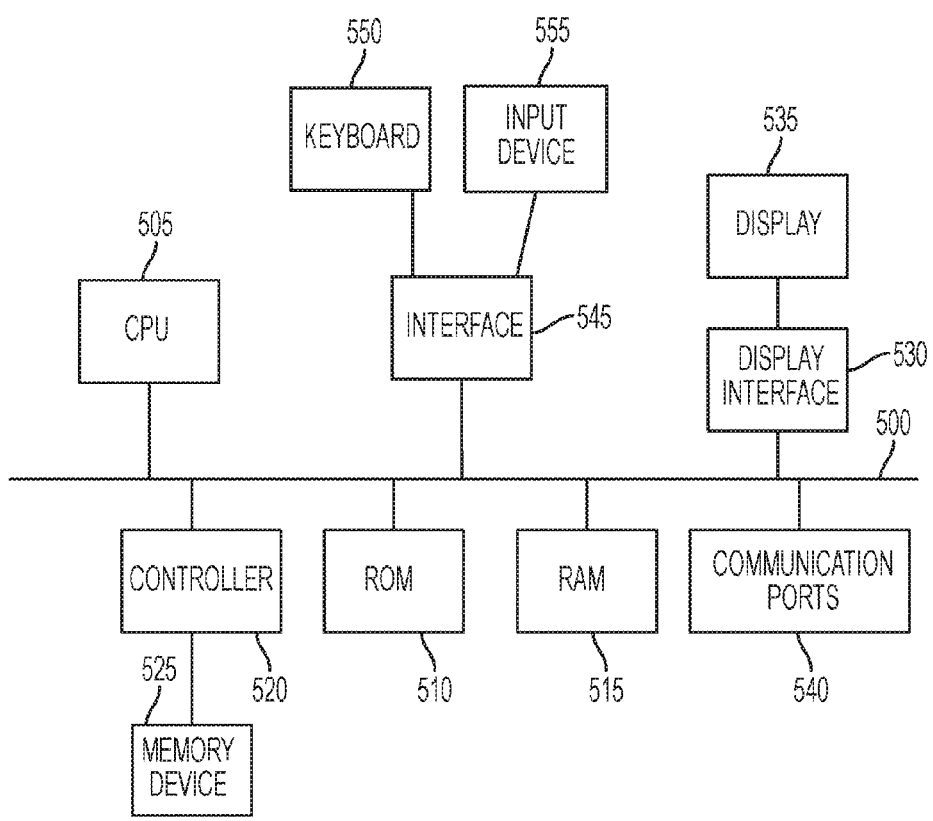
FIG. 14 depicts various embodiments of one or more electronic devices for implementing the various methods and processes described herein.

The above illustrated embodiments described in FIGS. 1-13 can be implemented in various configurations. For example, the system may implement these functions by a processor of the fare management system, a processor of the fare collection system or a processor on a cloud. FIG. 14 depicts an example of internal hardware that may be included in any of the electronic components of the system, such as the processing device, the fare collection system, or the token reader. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 525. A memory device, also referred to as a computer-readable medium, may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a transmitter and/or receiver, antenna, an RFID tag and/or short-range or near-field communication circuitry. A communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device and/or an audio input device. Digital image frames also may be received from an imaging capturing device 555 such as a video or camera positioned a stop in the public transit network. For example, the imaging capturing device may include imaging sensors installed in a fare collection system. A positional sensor and motion sensor may be included as input of the system to detect position and movement of passengers in the public transit network.

Optionally, the hardware may not need to include a memory, but instead programming instructions are running on one or more virtual machines or one or more containers on a cloud. For example, the processing device 102 (in FIG. 1) may be a server on a cloud that includes multiple virtual machines, each virtual machine having an OS, a virtual disk, virtual network and Apps, and the programming instructions for implementing various functions in the public transit network may be stored on one or more of those virtual machines on the cloud.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A fare collection and management system in a public transit network, comprising:
   a fare collection system configured to collect fare information from a number of passengers boarding or getting off a vehicle;
   a fare management system communicatively coupled to the fare collection system;
   a processing device; and
   a non-transitory computer readable medium in communication with the processing device, the computer readable medium storing one or more programming instructions for causing the processing device to:
   receive fare information from the fare collection system via a communication network and use the received fare information to determine a fare return series over a period of time,
   apply a Capital Asset Pricing Model to the fare return series to generate a report comprising a return versus volatility chart for a plurality of fare classes,
   output the report, and
   cause the fare management system to take an action based on the generated report.

2. The system of claim 1, wherein the fare information received from the fare collection system comprises a fare value indicative of a fare class and a time stamp recording when a passenger boards or gets off the vehicle.

3. The system of claim 2, wherein:
   the fare collection system comprises a token reader; and
   the one or more programming instructions comprise additional programming instructions that are configured to cause the processing device to receive, from the token reader, a fare value indicative of a fare class and a time stamp recording when a passenger who bore a token passes within a detectable communication range of a receiver of the token reader.

4. The system of claim 3, wherein the token reader is configured to:
   read a smart card including a RFID chip;
   read a card including a magnetic medium that stores the fare value;
   read a barcode off a medium or a display; or
   communicate with a mobile device via a wireless communication link.

5. The system of claim 4, wherein the token reader is positioned at a transit stop in the public transit network or onboard a vehicle dispatched in the public transit network.

6. The system of claim 1, wherein the one or more programming instructions for generating the report comprise programming instructions that are configured to cause the processing device to determine a beta value for each of the plurality of fare classes, wherein the beta value is indicative of riskiness of each fare class with respect to revenue generation.

7. The system of claim 6, wherein the one or more programming instructions for determining the beta value for each fare class comprise programming instructions that are configured to cause the processing device to:
   determine a fare return for each fare class by identifying a portion of the fare return series pertaining to each fare class of the plurality of fare classes;
   determine a first fare series based on averaging the fare returns across all fare classes of the plurality of fare classes;

identify a total number of passengers at a time period from the fare return series over the time period and determine a second fare series based on the total number of passengers over the time period; and calculate a beta value for each fare class based on the fare return for the fare class, the first fare series and the second fare series.

8. The system of claim 7, wherein the one or more programming instructions for calculating the beta value for each fare class comprise programming instructions that cause the processing device to determine the beta value based on:

$$\beta = \frac{\text{cov}(r_t^c - r_t^f, \overline{r_t} - r_t^f)}{\text{var}(\overline{r_t} - r_t^f)}$$

where cov is a covariance function, var is a variance function, $r_t^c$ is the fare return for fare class c over the time period t, $\overline{r}_t$ is the first fare series and $r_t^f$ is the second fare series.

9. The system of claim 7, wherein the programming instructions for generating a report comprise programming instructions that will cause the processing device to:
   determine an expected return value for each of the plurality of fare classes based on the beta value for each fare class, the first fare series and the second fare series; and
   determine a volatility value for each of the plurality of fare classes based a standard deviation of the fare return for each fare class.

10. The system of claim 6, wherein the one or more programming instructions for determining the beta value for each fare class comprise programming instructions that are configured to cause the processing device to:
   determine a fare return for each fare class by identifying a portion of the fare return series pertaining to each fare class of the plurality of fare classes;
   determine a first fare series based on averaging the fare returns across all fare classes of the plurality of fare classes;
   identify a total revenue at a time period from the fare return series over the time period and determine a second fare series based on the total revenue over the time period; and
   calculating a beta value for each fare class based on the fare return for the fare class, the first fare series and the second fare series.

11. The system of claim 1, wherein the one or more programming instructions comprise additional programming instructions that are configured to cause the processing device to provide a graphical user interface to allow a user to select a range of fare time series or time bins to display a return versus volatility chart based on the selected range.

12. The system of claim 1, wherein the report further comprises a return versus volatility chart for a plurality of routes and further wherein the programming instructions for causing the fare management system to take an action comprise programming instructions that are configured to cause the fare management system to:
   change a fare price for a fare class or delete a fare class;
   change a route or delete a route;
   combine one or more fare classes;
   combine one or more routes; or
   combine one or more fare classes with one or more routes.

13. A method of assessing riskiness of fare classes in a public transit network, comprising:
   collecting, by a fare collection system, fare information from a number of passengers boarding or getting off a vehicle;
   receiving, by a processing device, fare information from the fare collection system via a communication network and use the received fare information to determine a fare return series over a period of time;
   applying, by the processing device, a Capital Asset Pricing Model to the fare return series to generate a report comprising a return versus volatility chart for a plurality of fare classes;
   outputting, by the processing device, the report; and
   causing, by the processing device, a fare management system to take an action based on the generated report.

14. The method of claim 13, wherein the fare information received from the fare collection system comprises a fare value indicative of a fare class and a time stamp recording when a passenger boards or gets off the vehicle.

15. The method of claim 14, wherein receiving fare information comprises:
   receiving, by the processing device, from a token reader of the fare collection system, a fare value indicative of a fare class and a time stamp recording when a passenger who bore a token passes within a detectable communication range of a receiver of the token reader.

16. The method of claim 13, wherein generating the report comprises determining a beta value for each of the plurality of fare classes, wherein the beta value is indicative of riskiness of each fare class with respect to revenue generation.

17. The method of claim 16, wherein determining the beta value comprises:
   determining a fare return for each fare class by identifying a portion of the fare return series pertaining to each fare class of the plurality of fare classes;
   determining a first fare series based on averaging the fare returns across all fare classes of the plurality of fare classes;
   identifying a total number of passengers at a time period from the fare return series over the time period and determining a second fare series based on the total number of passengers over the time period;
   calculating a beta value for each fare class based on the fare return for the fare class, the first fare series and the second fare series.

18. The method of claim 17, wherein calculating the beta value for each fare class comprises determining the beta value based on:

$$\beta = \frac{\text{cov}(r_t^c - r_t^f, \overline{r_t} - r_t^f)}{\text{var}(\overline{r_t} - r_t^f)}$$

where cov is a covariance function, var is a variance function, $r_t^c$ is the fare return for fare class c over the time period t, $\overline{r}_t$ is the first fare series and $r_t^f$ is the second fare series.

19. The method of claim 17, wherein generating the report comprises:
   determining an expected return value for each of the plurality of fare classes based on the beta value for each fare class, the first fare series and the second fare series; and determining a volatility value for each of the plurality of fare classes based a standard deviation of the fare return for each fare class.

20. The method of claim 16, wherein determining the beta value for each fare class comprises:
    determining a fare return for each fare class by identifying a portion of the fare return series pertaining to each fare class of the plurality of fare classes;
    determining a first fare series based on averaging the fare returns across all fare classes of the plurality of fare classes;
    identifying a total revenue at a time period from the fare return series over the time period and determine a second fare series based on the total revenue over the time period; and
    calculating a beta value for each fare class based on the fare return for the fare class, the first fare series and the second fare series.

21. The method of claim 13 further comprises providing a graphical user interface to allow a user to select a range of fare time series or time bins to display a return versus volatility chart based on the selected range.

22. The method of claim 13, wherein the report further comprises a return versus volatility chart for a plurality of routes and further wherein causing the fare management system to take an action comprises causing the fare management system to:
    change a fare price for a fare class or delete a fare class;
    change a route or delete a route;
    combine one or more fare classes;
    combine one or more routes; or
    combine one or more fare classes with one or more routes.

* * * * *